United States Patent [19]

Manduley

[11] Patent Number: 4,692,870
[45] Date of Patent: Sep. 8, 1987

[54] GENERAL PURPOSE PROCESSOR MODULE FOR MAILROOM EQUIPMENT

[75] Inventor: Flavio Manduley, Woodbury, Conn.

[73] Assignee: Pitney Bowes Inc., Stamford, Conn.

[21] Appl. No.: 684,411

[22] Filed: Dec. 20, 1984

[51] Int. Cl.[4] ............................................. G06F 15/20
[52] U.S. Cl. ..................................... 364/466; 364/900
[58] Field of Search ......... 364/464, 466, 200 MS File, 364/900 MS File

[56] References Cited

U.S. PATENT DOCUMENTS

| | | | |
|---|---|---|---|
| 4,410,961 | 10/1983 | Dlugos et al. | 364/900 |
| 4,410,962 | 10/1983 | Daniels et al. | 364/900 |
| 4,481,587 | 11/1984 | Daniels, Jr. | 364/466 |
| 4,516,209 | 5/1985 | Scribner | 364/466 |
| 4,541,053 | 9/1985 | Knoth et al. | 364/466 |
| 4,578,774 | 3/1986 | Muller | 364/466 |

*Primary Examiner*—Felix D. Gruber
*Assistant Examiner*—H. R. Herndon
*Attorney, Agent, or Firm*—Robert H. Whisker; Melvin J. Scolnick; David E. Pitchenik

[57] ABSTRACT

A computation and control module suitable for use in a variety of postal scales as well as other types of mailroom equipment is disclosed. The module includes a microprocessor and associated circuitry; connectors for connecting ROM, which store firmware for controlling the microprocessor, and PROM, which store postal rate charts; an input/output connector; a serial interface for communications with postage meters; a non-volatile memory for storing parameters specific to particular units; and an auxiliary input/output connector. The auxiliary input/output connector is driven by selected, memory mapped interface circuitry mounted on the PROM card. The module also includes a load cell interface and a power supply. In one embodiment switches, responsive to the microprocessor, are provided for sequentially energizing various connectors and interfaces, so as to reduce power requirements. Systems comprising a plurality of computation and control modules are disclosed. Other systems including battery powered modules mechanically and electrically interconnected by a power distribution bus are also disclosed, as a modular power bus.

15 Claims, 5 Drawing Figures

GENERAL PURPOSE PROCESSOR MODULE FOR MAILROOM EQUIPMENT

BACKGROUND OF THE INVENTION

Postal scale are well known in the art; simple spring scales with scale charts which map a weight range into one or more postal rates having existed for decades. More recently, with the increased availability of solid state microprocessors, load cells and low-cost analog-to-digital (A/D) converters it has become feasible to provide electronic, digital postal scales with greatly increased capabilities. Such scales range from simple inexpensive scales with maximum weight capacities of about one pound and a limited selection of postal rates to scales with maximum weight capacities of one hundred pounds or more, the ability to compute large selections of postal rates, zip-to-zone conversion, special service fees, and other capabilities. Further, postal scales having more extensive capabilities also frequently include the capacity to connect to electronic postage meters to set appropriate values, and to be connected to other mailroom equipment, such as electronic postal accounting systems and journal printers.

Because the capabilities a various models of postage scale are so different; capabilities tending to grow as the maximum weight capacity for a scale increased, each model scale for a particular manufacture has been largely a unique design with little commonality of components between models. And, of course, this has applied even more strongly between postal scales and other mailroom equipment such as electronic accounting systems.

As capabilities grew additional programming features where required, storage of additional postage rates was necessary and the keyboard and display configurations provided to the operator might change. For example, in a relatively low range, low cost scale a numeric keypad might be used to enter all the necessary information, such as class of service, zip code of destination, special services, etc., needed to compute the appropriate postage. In a larger scale with a greater maximum weight capacity more capabilities might be included; more classes of service, a larger number of special services, etc., and a more complex keyboard and display, such as that described in U.S. Pat. No. 4,286,325, to: Dlugos et al, might be provided.

Heretofore, their diversity of function has led to a diversity of design in mailroom products. Thus, it is an object of the subject invention to provide increased commonality of components among various postal scale products as well as other mailroom systems.

It is a more particular object of the subject invention to provide an electronics module which is capable of handling computational and communications functions for a broad line of postal scale products and other mailroom products.

Other objects and advantages of the subject invention will be readily apparent to those skilled in the art from consideration of the detailed description set forth below and of the attached drawings.

BRIEF SUMMARY OF THE INVENTION

The disadvantages of the prior art are overcome and the above objects are achieved by an electronics module in accordance with the subject invention comprising apparatus, such as a motherboard, for mounting electronic components and connectors; a microprocessor and associated circuitry mounted on the mounting apparatus for processing weight information and/or postal information relating to an item to be mailed; a first connector mounted on said mounting means for operatively connecting read-only-memory (ROM) modules to the microprocessor so that appropriate firmware to program said microprocessor may be provided for a preselected set of capabilities; a second connector mounted on said mounting means for operatively connecting ROM modules, which, in a preferred embodiment, are programmable ROM's (PROM's) to the microprocessor so that appropriate information for the determination of postage values may be provided, (e.g. postal rate charts, zip-to-zone conversions, special service fees, etc.); an input/output connector mounted on said mounting means for operatively connecting a keyboard and display to the microprocessor to provide an operator interface for entry of postal information and commands; a serial data interface for the transmission of information relating to items to be mailed; and a first ROM module containing information for determining postage values and operatively connected to the microprocessor by one of the second set of connectors; the ROM module also containing information defining the inputs received from the keyboard.

In a preferred embodiment, the module is intended for use in a postal scale and a PROM, or PROM's, is connected to the microprocessor through the second connector. The PROM contains information for computing appropriate postage values for items to be mailed and information defining the configuration of the keyboard and display, so that additional postage rates, special fee rates, etc. and different operator input/output configurations such as keyboards with expanded capability, may be used with a simple substitution of PROM's.

Thus, the subject invention provides a module which advantageously will provide computational and control functions for a broad family of postal scale products as well as other mailroom systems. Other objects and advantages of the subject invention will be readily apparent to those skilled in the art from consideration of the detailed description set forth below and of the attached drawings.

DETAILED DESCRIPTION OF PREFERRED EMBODIMENTS OF THE INVENTION

Figure 1:
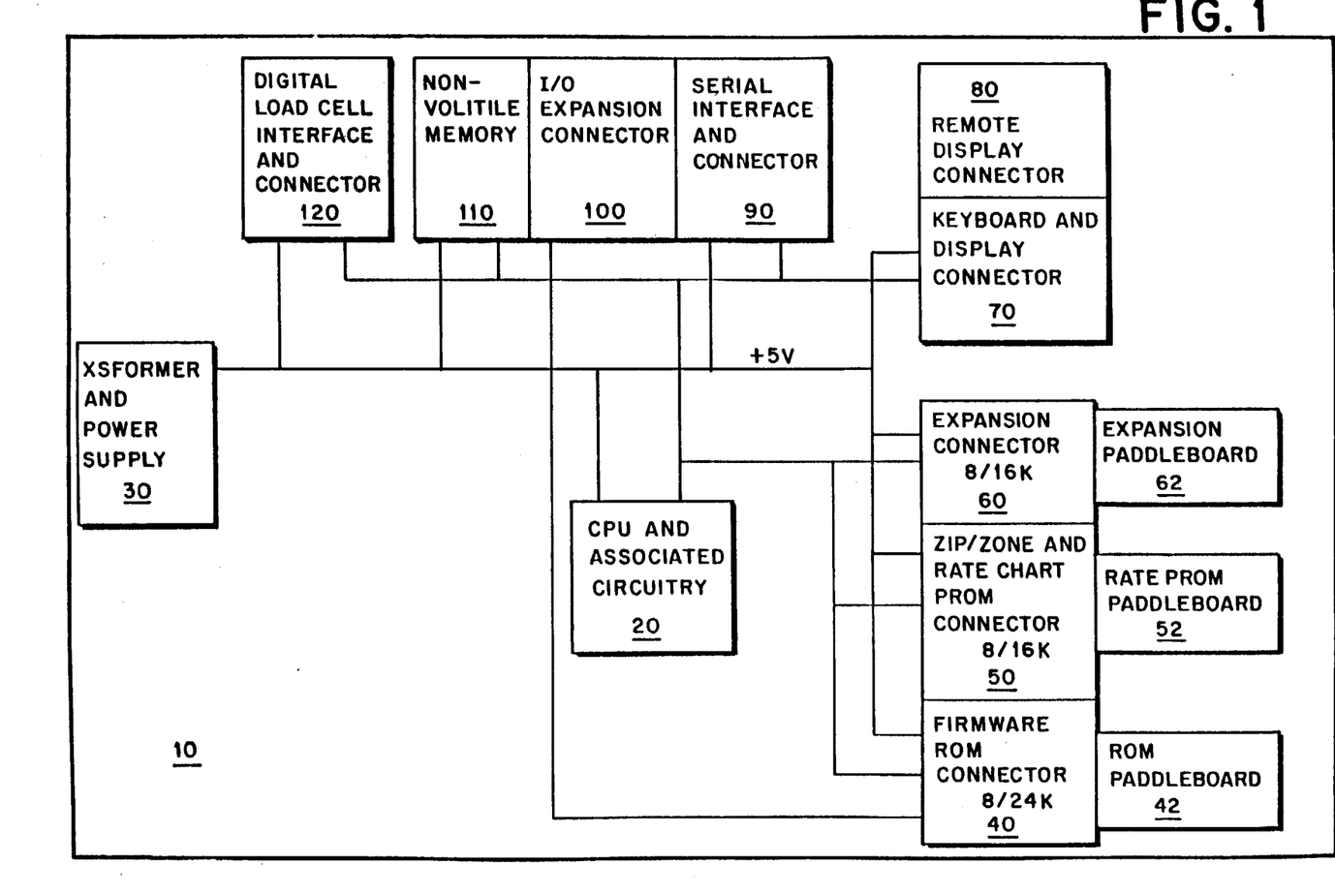
FIG. 1 shows a schematic block diagram of a computation and control module for use in postal scales and other mailroom equipment.

FIG. 1 shows a computation and control module for use in postage scales and other mailroom equipment, such as electronic accounting systems, in accordance with the subject invention. A large printed circuit board 10, commonly known as a "motherboard" supports the various components and connectors comprising the subject computation and control module. An integrated circuit microprocessor and its associated support circuitry are mounted on motherboard 10 to provide intelligence (i.e., programmable, general purpose computation and control capabilities) for the subject module. Such microprocessors are well know to those skilled in the art. Typical of such microprocessors is the well known Intel Model 8085, manufactured by the Intel Corp., Santa Clara, Calif. Descriptions of the architectural structure of the 8085 and procedures for operationally connecting such microprocessors with various memory and input/output devices may be found in MCS-80/85 Family User's Manual, published by Intel Corp., 1979. Similar microprocessors and information are available from other manufacturers and are well known to those skilled in the art. Accordingly detailed description of the microprocessor, its associated circuitry and its interface to other components is unnecessary to an understanding of the subject invention and will not be discussed further.

Connectors 40, 50, 60 are connected to microprocessor 20 to allow the easy connection of memory modules to microprocessor 20 (the term "connector" as used herein is meant to include both single connectors or groups of connectors used together to perform a function. Similarly, paddle boards and other sub modules may comprise single units or groups of related units.) Connector 40 allows 8K to 24K bytes of read-only-memory (ROM) mounted on paddleboard 42 to be connected to microprocessor 20. This memory is used to store the firmware used to control the postal scale (or other item of postal equipment) comprising the subject module. Connector 50 allows 8K to 16K bytes of programmable-read-only-memory (PROM) mounted on paddleboard 52 to be connected to microprocessor 20. This memory is used to store postal rate charts and zip-to-zone information, which information is used to convert zip codes to postal zones for computing postage. (PROM's are preferred for storing postal rate data since such data is subject to fairly frequent change. However, those skilled in the art will recognize that, once programmed, PROM's and ROM's are functionally the same. Thus, hereinafter, while recognizing that either PROM's or ROM's may be used, "PROM's" will refer to postal rate and zip-to-zone memory while "ROM's" will refer to firmware memory). Connector 60 allows 8K to 16K of additional memory (ROM or PROM) to be connected to microprocessor 20 to provide an expansion capability for larger systems.

Connector 70 is provided to allow microprocessor 20 to communicate with a keyboard and display (not shown) to provide an operator interface. Connector 70 provides, as outputs, a serial data line, a serial clock line, 3 lines of encoded keyboard strobe signals, and a reset signal for clearing the display, all appropriately buffered; and 6 lines of keyboard return and an interrupt line as inputs. A +5 volt line and return are provided to supply power to the keyboard and display control logic. This arrangement allows up to 48 keys to be scanned by microprocessor 20 using a conventional strobe and return technique. The keys used will be defined (i.e., their meanings mapped) by information stored in PROM's 52 so that definitions of keys may be easily changed and an expanded keyboard may be used with the extended postal rate charts and zip-to-zone information used in more sophisticated models of postal scales. (Alternatively the keyboard may be defined by information stored in firmware ROM's 42).

In other mailroom equipment, such as electronic accounting systems, a more elaborate and extensive keyboard may be required. Such a keyboard and display would include a keyboard/display controller such as the Model 8279 manufactured by the above identified Intel Corp. To allow for this expansion of keyboard capability the data line may be made bi-directional to communicate with the keyboard/display controller.

Preferably the display may be a conventional multi-element flourescent display. High voltage and filament power may be supplied for the display either through connector 70 or locally at the display.

Remote display connector 80 parallels the display connections of connector 70; providing a data line, data clock and a +5 volt supply and return to allow for the provision of a remote display. The remote display would include its own controller and high voltage and filament supplies.

Connector 90 is provided to allow connection of the postal scale to a postage meter through a secure communications link. Since the operation of a postage meter is equivalent to the purchase of postage it is critical that the transmission of postage information from the postal scale to the meter be error free. A proprietary interface and protocol intended for such error free transmission of postal data to a postage meter is described in U.S. Pat. No. 4,301,507, for Electronic Postage Meter Having Plural Computing Systems to, Soderberg et al, issued Nov. 17, 1981, which is hereby incorporated by reference; and is known by the trade name Echoplex. Connector 90 provides an Echoplex serial data out line and return, a meter trip line, (which includes special protective circuitry to prevent the generation of false meter trip signals during power on/off transients) and return and a reset line as outputs. Inputs provided are an Echoplex serial data-in line, a return, and an interrupt line. A +5 volt line and return are provided to provide a remote reference level for signal detection, with return. Preferably the +5 volt line is short circuit protected.

Connector 90 also provides a unregulated +5 volt line which may be used to provide power to a two port interface expansion module mounted on a separate board. In more sophisticated scales such a board allows communication with a postage meter and with devices such as electronic accounting systems.

It should be noted that the Echoplex circuitry provided in the module of the subject embodiment does not include optoisolators but relies on the isolators of the connected postage meter. However the two port expansion board may preferably include a port with isolators for communication with devices such as electronic accounting systems which may not include isolators.

Connector 100 is provided to allow input/output expansion. A number of undefined lines are connected from firmware connector 40 to connector 100. This allows additional input/output circuitry to be mounted on ROM paddleboard 42. Thus, for example, a field upgrade of a postal scale to provide a printer output may be achieved simply by changing paddleboard 42; the substitute board would not only include firmware to control the printer but also input/output circuitry which would provide a printer port at connector 100. (Those skilled in the art will recognize that since microprocessors such as the 8085 use "memory mapped I/O"; where input/output registers are addressed as memory locations, input/output circuitry mounted on paddleboard 42 is directly accessable to microprocessor 20).

Non-volatile memory 110 comprises a small amount of memory such as electrically-erasable-programmable-read-only-memory ($E^2PROM$'s). This memory is discussed separately from other memory since it is used to store data which is peculiar to particular scales. It is used to store information such as load cell calibration constants, (e.g., zero, correction factors) configuration parameters (e.g., meter in use, automatic set mode) and customer location zip code (for zip-to-zone conversion). Preferably this data will be stored with redundancy so that errors may be detected and, possibly, corrected. It is also preferred that the data be electrically alterable so that it may be changed or corrected through microprocessor 20.

Digital interface and connector 120 is provided to allow transmission of raw digital data from the load cell transducers, after conversion by the associated analog-to-digital converter (A/D). Details of the design of this interface would depend on the particular load cell and associated circuitry chosen for the load cell but would be well within the abilities of those skilled in the art. (Numerous patents including U.S. Pat. Nos. 4,139,892 and 4,350,216 show techniques for interfacing load cells to microprocessors). Having selected a particular interface design and protocol it would be routine for a person skilled in the art to adapt it to a product family of scales; essentially requiring only the provision of a sufficient number of data bits to allow the desired precision through the whole family of scales.

Preferably the load cell subsystem includes its own control processor. This would allow the load cell raw digital data, commonly known as counts, to be transmitted with error detection/correction redundancy (check sums, etc.) and two way communications; to check status, request retransmission in the event of an error, etc. Further incorporation of a microprocessor into the load cell subsystem would reduce the design of interface 130 to a routine processor to processor communications problem.

In use the function of the module of the subject invention would be controlled by the selection of ROM paddleboard 42, PROM paddleboard 52 and the information stored in non-volatile memory 110. For example, if the module of the subject invention were intended for use in a low range, unsophisticated scale with limited keyboard and display capabilities board 42 would be chosen lacking input/output circuitry and with ROM's programmed with firmware appropriate for the intended unsophisticated application. Board 62 would be selected with PROM's defining a limited selection of postal rates and defining a limited keyboard. In a very unsophisticated system zip-to-zone information might be entered through the keyboard. In such a system non-volatile memory 110 would only include load cell calibration constants and no zip-to-zone conversion tables would be provided.

In a more sophisticated system boards 42 and 52 would be selected to provide increased capabilities, zip-to-zone conversion, increased postal rate information, automatic meter setting, extended keyboard definitions, etc. In such a system non-volatile memory 110 would include calibration constants, configuration parameters and customer location zip code.

Programming for postal scales is disclosed in U.S. Pat. No. 4,286,325, to Dlugos, et al, for *System And Method For Computing Domestic And International Post-* *age,* issued Aug. 25, 1981; and U.S. Pat. No. 4,325,440 to Crowley, et al, for *Method And System For Computing Special Fees In A Parcel Postage Metering System,* issued Apr. 20, 1982, which are hereby incorporated by reference. Such programming could readily be translated into firmware for a particular microprocessor by a person skilled in the art.

Further the module of the subject invention may also readily be used in mailroom systems such as electronic accounting systems, manifest systems, mailroom management systems or journal printers. (These systems are well known for use in mailrooms to record records of postal activity for later retrieval). For example, if the module of the subject invention where intended for use in a journal printer, board 42 would be selected to include journal printer firmware and printer I/O circuitry connected to expansion connector 100. Such a system might well require a full, general purpose keyboard and display and use the bi-directional serial communications provided through keyboard and display connector 70. Data would be received through serial interface 90; and in order to retain data for later retrieval random-access-memory would be provided on paddleboard 62, either through expansion connector 60 and/or by replacing PROM's on board 52.

Figure 2:
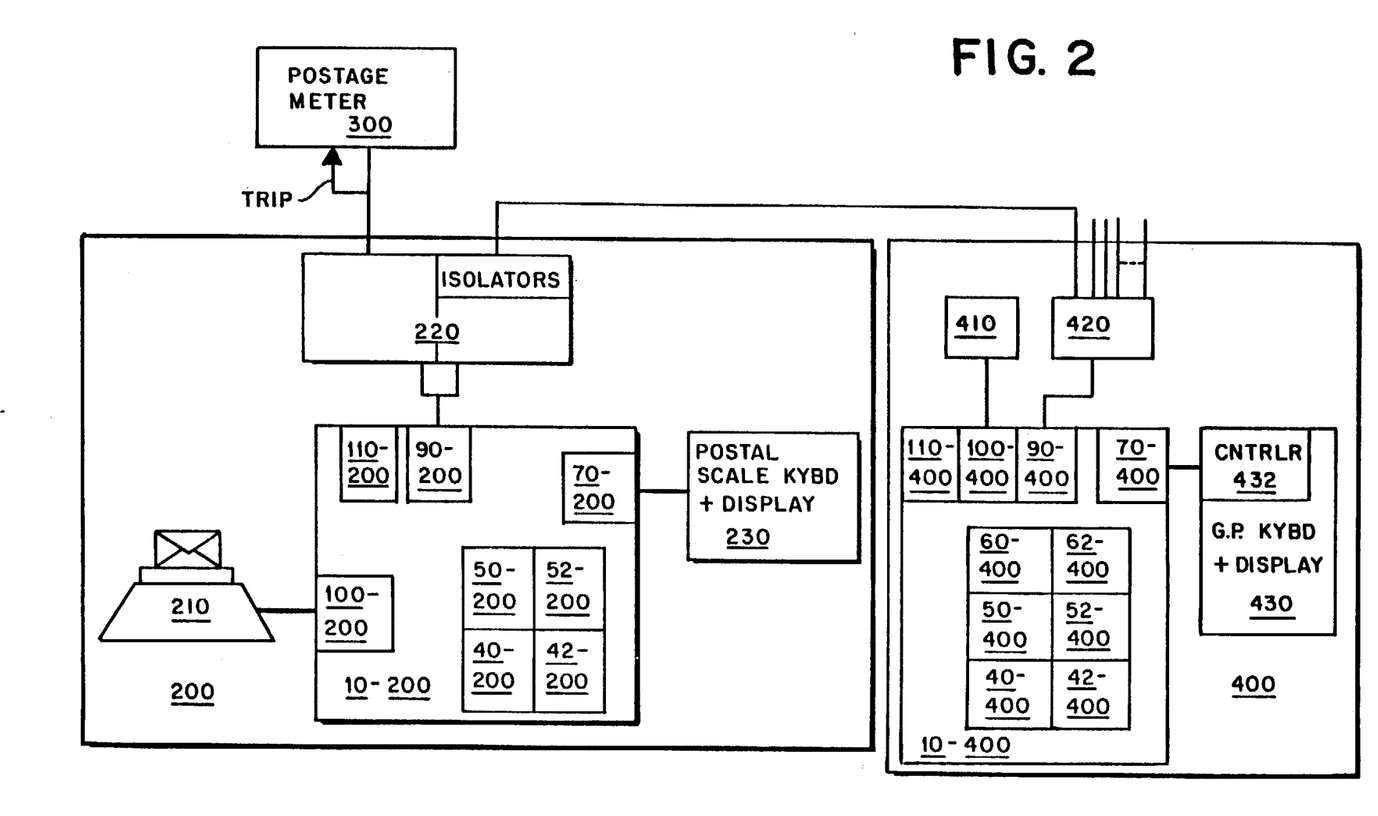
FIG. 2 shows a schematic block diagram of a mailroom system.

FIG. 2 shows a mailroom system comprising a postal scale 200, a conventional electronic postage meter 300 and an electronic system 400. Postal scale 200 comprises module 10-200 in accordance with the subject invention, a load cell subsystem 210 which provides count data for the item weighed through interface and connector 120-200, a port expander 220 connected to Echoplex port 90-200 and a specialized postal scale keyboard and display connected through connector 70-200. Board 42-200 provides firmware which controls module 10-200 in accordance with the desired capabilities. In addition to firmware for computing appropriate postage value in accordance with the weight of the item and postal information input through keyboard and display unit 230 board 42-200 also provides firmware for communications with other systems which may be connected to scale 200. Such communications firmware is selected by the processor (not shown) of module 10-200 in accordance with configuration parameters stored in non-volatile memory 110-200. In the system shown module 10-200 would communicate with a conventional postage meter 300, which may be a meter such as the Model 6500 meter manufactured by Pitney Bowes Inc., Stamford, Conn. and electronic system 400. In addition to transmitting postage values and trip signals to meter 300 module 10-200 also transmits postal information such as postage value, weight destination, zip code, etc. to electronic system 400.

Board 52-200 provides appropriate postal rate information and zip-to-zone information for scale 200, and also provides information defining the keys of keyboard display unit 230, which is read by a conventional strobe and return technique through connector 70-200.

System 400 may be any of a number of mailroom systems for logging postal data; such as, electronic accounting systems, journal printers, mailroom management systems, etc. Such systems also provide for later retrieval of the data either by printer, downloading to a disk, computer interface, or other means.

Such a system is shown in FIG. 2 based on module 10-400, which is structurally identical to module 10-200. Board 42-400 provides firmware which defines the data logging and system control functions. Such programming would essentially involve no more than simple data base management and routine "housekeeping" functions for the system shown and would be well within the skill of those skilled in the art. Boards 52-400 and/or 62-400 would connect RAM memory to module 60-400. Such RAM storage may be used for temporary storage of logged postal data. (Design of connectors 50 and/or 60 to accept either ROM or RAM memory would be a routine task well within the capability of those skilled in the art.)

As described above scale 200 communicates with system 400 through Echoplex connector 90-200 and expander 220. System 40 also communicates through Echoplex connector 400 and may include expander 420 to allow communication with additional scales.

Device 410, which, as indicated above, may be a printer or other means for retrieving logged data, is connected to module 10-400 through connector 100-400 and appropriate interface circuitry on board 42-400.

Non-volatile memory 110-400 may contain configuration parameters such the number of scales connected to system 400, the particular model of printer connected, etc Because an operator may need to exercise greater control over system 400 it includes a general purpose keyboard and display unit 430 which further includes a control unit 432. Control unit 432 communicates with module 10-400 through the bi-directional data line of connector 70-400.

Because power supply 30 provides power to all the active components on motherboard 10 as well as other components attached to motherboard 10 it must be sized to support the largest system in which it may be used. Accordingly, to avoid burdening less sophisticated systems with the cost of an oversized power supply FIG. 3 shows an embodiment of the subject invention having a reduced power requirement.

Figure 3:
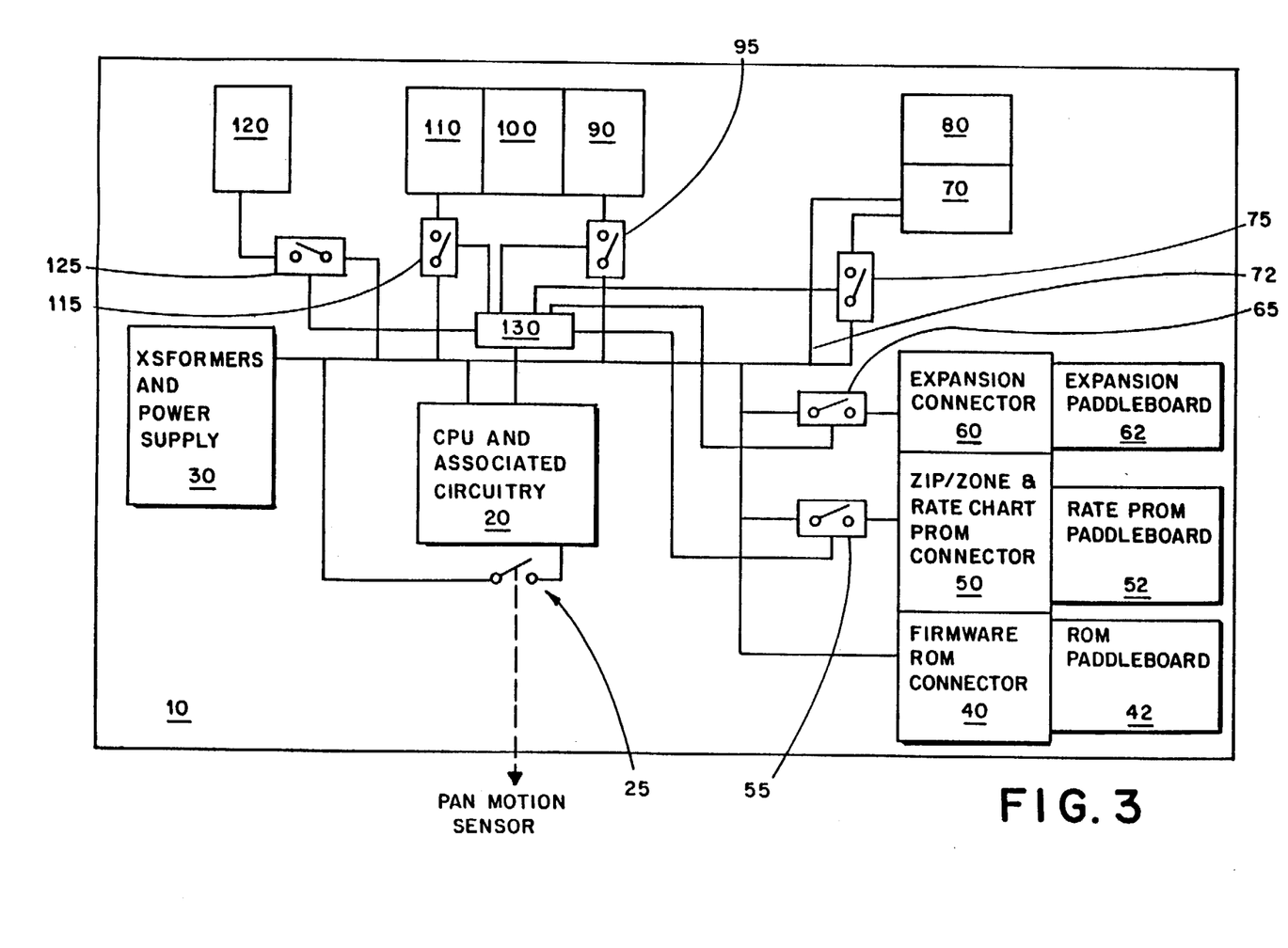
FIG. 3 shows a schematic block diagram of a computation and control module substantially similar to that shown in FIG. 1, which further shows power switching arrangements used to reduce power requirements.

FIG. 3 shows a module which is substantially the same functionally as the module shown in FIG. 1 (Note that the communications links between subsystems are the same but are not shown in FIG. 3 for ease of illustration). Normally open CMOS switches 55, 65 75, 95, 115 and 125 are connected in series with the +5 volt lines of connectors 50, 60, 70, 90, non-volatile memory 110 and connector 120, reducing the stand-by power drain on power supply 30. Switch assembly 25 connects the +5 volt source to an interrupt input of microprocessor 20 and is actuated, either mechanically, electro-optically, or in some other suitable manner, by motion of the scale pan (not shown). In response to the interrupt microprocessor 20 would command power control circuit 130 to close switch 125 to energize the load cell subsystem (not shown) and digital load cell interface 120, so that the weight counts from the load cell subassembly can be generated and transmitted. When a stable count input is received switch 125 is opened and switch 115 closed so that the parameters stored in non-volatile memory 110 may be retrieved. Switch 115 is then opened and switch 75 is closed so that the operator may enter the necessary information for the item to be mailed. (Note that preferably a separate, unswitched +5 volt source 72 is also provided to connector 80 to keep the keyboard of the keyboard/display unit (not shown) live so that operation of the scale may also be initiated from the keyboard). Switch 75 is then opened and switch 50 and, if necessary, switch 60 are closed to energize boards 52 and 62 so that necessary postal rate information and zip-to-zone conversion information may be retrieved.

The appropriate postage value for the item to be mailed is then determined by microprocessor 20 and switches 55 and 65 are opened. If the configuration parameter information retrieved from non-volatile memory shows a postage meter connected switch 95 is closed to energize the Echoplex interface and connector 90 for transmission of the postage value information to such meter. Switch 75 is then opened and microprocessor 20 returns to a wait state until the next interrupt (or command from the keyboard).

Thus, the peak power demands on supply 30 are substantially reduced, allowing use of a smaller less costly supply. In less sophisticated systems, with low peak power requirements, power controller 130 may be omitted and switches 55, 65,. 75, 95, 115 and 125 may be replaced, where necessary, with jumpers to reduce the cost of the module and to simplify the firmware.

In another embodiment of the subject invention the ROM's and PROM's of boards 42, 52 and 62 may be replaced with battery powered memory modules. Such modules are disclosed in commonly assigned U.S. patent application Ser. No. 590,670, for Postal Rate Memory Module with Integral Battery Power, by Flavio Manduley, filed Mar. 19, 1984, which is hereby incorporated by reference. By incorporating battery power on boards 43, 52 and 62 additional memory may be added for more sophisticated systems without need for a larger power supply. Further, incorporating battery power on boards allows preprogrammed RAM's to be shipped to users for postal rate updates, etc. and the use of only RAM memory with the module of the subject invention simplifies it use in application such as journal printers and electronic accounting systems where RAM storage is needed.

Figure 4:
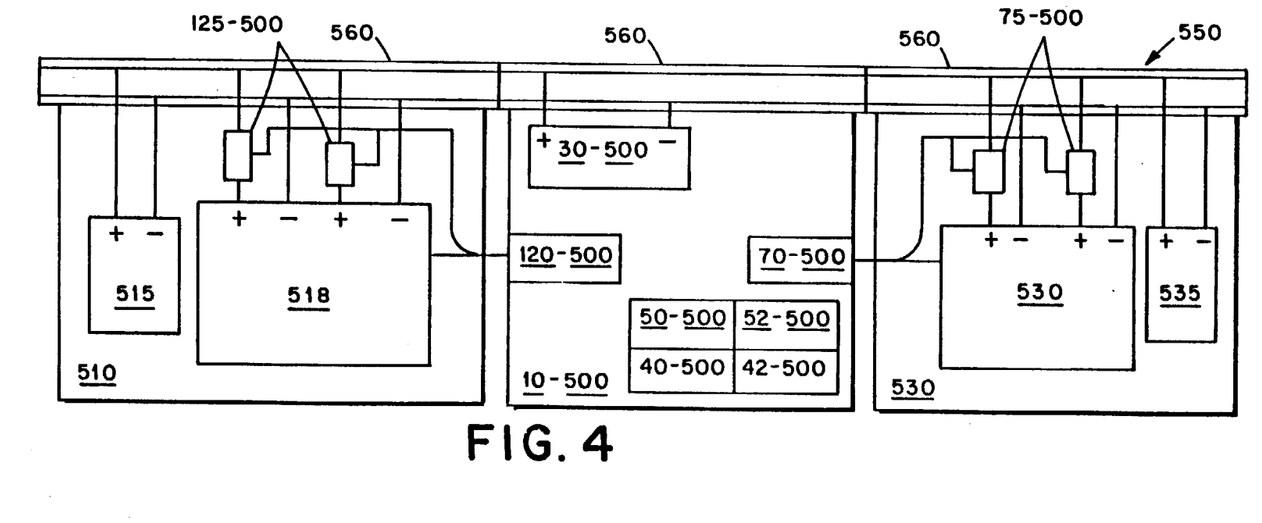
FIG. 4 shows a schematic block diagram of a modular, battery powered mailroom system.

With the availability of low power CMOS logic and low power displays it is possible to extend the idea of battery powered modules to encompass entire battery powered modular systems. Such a system is shown in FIG. 4. A module in accordance with the subject invention 10-500 comprises battery powered paddleboards, 42-500 and 52-500, a battery power supply 30-500, and incorporates low power CMOS circuitry for active components. A load cell, or other pressure transducer, subsystem 510 utilizing low power circuitry 518 for amplifiers and A/D's is connected to module 10-500 through connector 120-500 and a low power keyboard and display subsystem 530 is connected through connector 70-500. Suitable low power load cell subsystems are known in the art and include low power modular load cells manufactured by the Toledo Scale Division of Reliance Electric Co., Worthington, Ohio, capacitance transducers manufactured by Serta Corp., Mass. and Digital Mass Transducers manufactured by K-Tron, Arizona Corp., Scottsdale, Ariz. Similarly low power displays and keyboards are available, ranging up to the typewriter type keyboard and multiline display used in the current generation of "laptop" computers.

Each subsystem includes its own battery power supply 515 and 535; again so that battery 30-500 need not be sized to supply the largest system contemplated.

Batteries 30-500, 515 and 535 are interconnected by a low impedance external power bus 550 to reduce noise problems and also to mechanically interconnect the subsystems.

Figure 5:
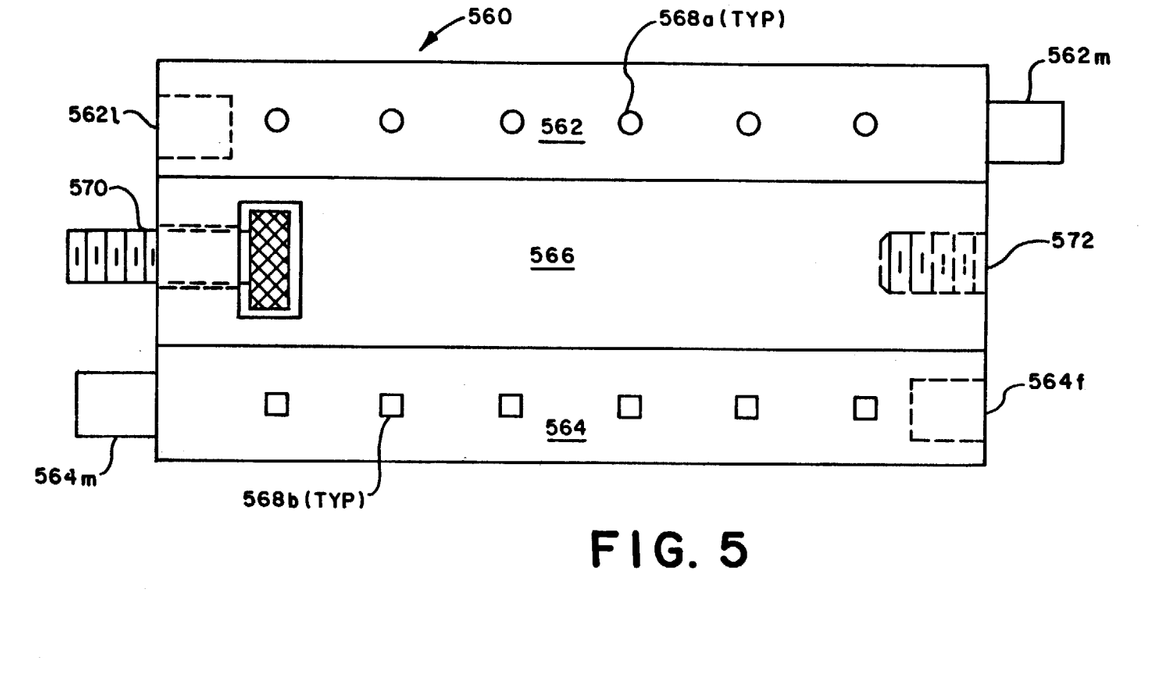
FIG. 5 shows a plan view of a power bus module.

Bus 550 is formed from a plurality of substantially identical segments 560, shown in FIG. 5. Segment 560 comprises two substantial, low impedance conductors 562 and 564; for +5 volts and ground respectively.

Conductors 562, 564 are held in parallel, fixed relationship by substantially rigid separator 566. Spaced along conductors 562 and 564 are polarized sockets 568a and 568b into which various battery powered subsystems may be plugged. The sockets are spaced closely enough that multiple connections may be made by each subsystem in order to minimize noise problems.

The ends 562m, 562f, 564m and 564f are shaped to mate with the corresponding ends of similar segments 560. At one end of separator 566 a captive thumbscrew 570 is mounted and a corresponding tapped bore 572 is provided at the other end so that a low impedance mechanically strong bus system may be formed by screwing together a plurality of segments 566. Mechanical and power connections between the subsystems of a battery power system such as that shown in FIG. 4 are made by plugging the subsystems into the bus so formed.

Returning to FIG. 4 the power drain on batteries 30-500, 515 and 535 may be further reduced by provision of switches 25,500 and 125-50 to sequentially connect subsystems as required; substantially in the same manner as described above with respect to the embodiment of FIG. 2.

The embodiments of the subject invention described above and shown in the attached drawings have been given by way of illustration only. Those skilled in the art will recognize numerous other embodiments within the scope of the subject invention.

What is claimed is:

1. An electronics module suitable for use in a plurality of different postage scales which may have various weight ranges and capabilities as well as in other types of mailroom equipment such as electronic accounting systems, comprising:
   (a) means for mounting electronic components and connectors;
   (b) processing means mounted on said mounting means for processing weight information or postal information relating to an item to be mailed;
   (c) a first connector mounted on said mounting means for connecting read-only-memory (ROM) modules for storing selected firmware to said processing means so that appropriate firmware to program said processing means in accordance with a preselected set of capabilities is provided;
   (d) a second connector mounted on said mounting means for connecting PROM modules for storing selected postal rate information to said processing means so that appropriate information for the determination of postage values is provided;
   (e) an input/output connector mounted on said mounting means for connecting keyboard means and display means to said processor means so as to provide an operator interface for entry of postal information and commands;
   (f) a serial data interface for the transmission of information relating to items to be mailed by said processing means; and,
   (g) a non-volatile memory module connected to said processing means through one of said first or second connectors, said non-volatile memory module containing information defining said keyboard means.

2. An electronics module as described in claim 1 wherein said module is for use in a postage scale and wherein a PROM module is connected to said processing means by said second connector, said PROM module connected by said second connector containing information for determining postage values, said information including postage rate charts, and further containing information defining said keyboard means and said display means, whereby at least one of the capabilities of said scale, such as weight ranges, classes of service, or special functions available are expanded and the keyboard and display functions redefined to reflect such expanded capabilities by the connection of a selected PROM module to said second of connector.

3. An electronics module as described in claim 2 further comprising a digital load cell interface and connector and a non-volatile memory for storing information defining correction parameters for a particular load cell.

4. An electronics module as described in claim 3 further comprising a secure serial interface and connector for communication with postage meters or postal accounting systems and an I/O expansion connector of for communication to devices such as printers and said non-volatile memory contains information defining the configuration of equipment connected to said module.

5. An electronics module as described in claim 4 further comprising a ROM module connected to said processing means through said first connector, said ROM module containing firmware for controlling a plurality of configurations of equipment attached to said module, and said processing means selecting appropriate firmware for execution in accordance with additional information stored in said non-volatile memory.

6. An electronics module as described in claim 5, further comprising power supply means for supplying power to said module and other components connected to said electronics module.

7. A postage scale comprising:
   (a) an electronics module as described in claim 5;
   (b) a keyboard and display subsystem connected to said electronics module through said input/output connector; and
   (c) a load cell subsystem connected to said electronics module through said digital load cell interface and connector, said load cell subsystem including a load cell, preamplifiers and other associated circuitry, and an analog-to-digital converter.

8. An electronics module as described in claim 4, further comprising power supply means for supplying power to said module and other components connected to said electronics module.

9. A postage scale comprising:
   (a) an electronics module as described in claim 4;
   (b) a keyboard and display subsystem connected to said electronics module through said input/output connector; and
   (c) a load cell subsystem connected to said electronics module through said digital load cell interface and connector, said load cell subsystem including a load cell, preamplifiers and other associated circuitry, and an analog-to-digital converter.

10. An electronics module as described in claim 3, further comprising power supply means for supplying power to said module and other components connected to said electronics module.

11. A postage scale comprising:
   (a) an electronics module as described in claim 3;
   (b) a keyboard and display subsystem connected to said electronics module through said input/output connector; and (c) a load cell subsystem connected to said electronics module through said digital load cell interface and connector, said load cell subsystem including a load cell, preamplifiers and other associated circuitry, and an analog-to-digital converter.

12. An electronics module as described in claim 2, further comprising power supply means for supplying power to said module and other components connected to said electronics module.

13. An electronics module as described in claim 1, further comprising power supply means for supplying power to said module and other components connected to said electronics module.

14. An electronics module suitable for use in a plurality of different postage scales which may have various weight ranges and capabilities as well as in other types of mailroom equipment such as electronic accounting systems, comprising:
   (a) means for mounting electronics components and connectors;
   (b) processing means mounted on said mounting means for processing weight information or postal information relating to an item to be mailed, said processing means having the capability to access external memory and the capability for memory mapped input/output;
   (c) a first connector mounted on said mounting means for connecting memory modules for storing selected software to said processing means so that appropriate software to program said processing means in accordance with a preselected set of capabilities is provided, said connector including a plurality of additional pins not used to connect said memory modules to said processing means;
   (d) an expansion connector for connecting an auxilary device to said processing means, the pins of said expansion connector each being connected to a corresponding one of said additional pins on said first connector,
   (e) a memory module connected to said processing means through said first connector, said memory module storing program information for controlling said processing means in accordance with a preselected set of capabilities, and said memory module further including interface circuitry for memory mapped input/output communications with a preselected auxilary device connected to said processing means through said auxilary connector, whereby the capability to control different devices is achieved by providing memory modules with appropriate program information and interface circuitry.

15. An electronics module as described in claim 14 further comprising:
   (a) a second connector mounted on said mounting means for connecting PROM modules to said processing means so that appropriate information for the determination of postage values may be provided;
   (b) an input/output connector mounted on said mounting means for connecting keyboard means and display means to said processor means so as to provide an operator interface for entry of postal information and commands; and
   (c) a serial data interface for the transmission of information relating to items to be mailed.

* * * * *

UNITED STATES PATENT AND TRADEMARK OFFICE
CERTIFICATE OF CORRECTION

PATENT NO. : 4,692,870
DATED : September 8, 1987
INVENTOR(S) : Flavio Manduley

It is certified that error appears in the above—identified patent and that said Letters Patent is hereby corrected as shown below:

Column 1, line 6:       change "scale" to --scales--.

Column 1, line 25:      change "a" to --of--.

Column 1, line 26:      change "scale" to --scales--.

Column 3, line 6:       change "know" to --known--.

Column 4, line 42:      change "a unregulated" to --an unregulated--.

Column 5, line 2:       change "accessable" to --accessible--.

Column 7, line 21:      change "such the" to --such as the--.

Column 7, line 42:      after "65" insert --,--.

Column 8, line 33:      change "it use" to --its use-- and "application" to --applications--.

Column 10, lines 19 & 20:   change "connector of for" to --connector for--.

Signed and Sealed this

Thirty-first Day of January, 1989

Attest:

DONALD J. QUIGG

Attesting Officer   Commissioner of Patents and Trademarks